United States Patent [19]
Van Den Brink et al.

[11] Patent Number: 6,019,953
[45] Date of Patent: Feb. 1, 2000

[54] PROCESS FOR GAS INCINERATION

[75] Inventors: Peter John Van Den Brink; Hans Michiel Huisman; Inge Roos; Thoms Stanley Vermeulen, all of Amsterdam, Netherlands

[73] Assignee: Shell Oil Company, Houston, Tex.

[21] Appl. No.: 08/899,368

[22] Filed: Jul. 23, 1997

[30]  Foreign Application Priority Data

Jul. 26, 1996 [EP] European Pat. Off. .............. 96202132

[51] Int. Cl.$^7$ ............................ B01D 53/48; B01D 53/52
[52] U.S. Cl. .................................. 423/242.1; 423/244.09; 423/244.1; 423/224; 423/230
[58] Field of Search ..................................... 502/306, 311, 502/319, 321, 353, 354, 514; 423/576.8, 244.1, 244.09, 242.1, 224, 230

[56]  References Cited

U.S. PATENT DOCUMENTS

| | | | |
|---|---|---|---|
| 4,002,720 | 1/1977 | Wheelock et al. ...................... | 423/230 |
| 4,012,486 | 3/1977 | Singleton ................................. | 423/224 |
| 4,247,727 | 1/1981 | Tremont et al. ........................ | 585/428 |
| 4,323,703 | 4/1982 | Grasselli et al. ........................ | 562/546 |
| 4,344,926 | 8/1982 | Petty et al. .............................. | 423/244 |
| 4,937,058 | 6/1990 | Dupin et al. ............................ | 423/224 |
| 5,084,257 | 1/1992 | Griffith et al. .......................... | 423/244 |
| 5,413,974 | 5/1995 | Yokoyama et al. ..................... | 501/153 |

FOREIGN PATENT DOCUMENTS

| | | | |
|---|---|---|---|
| 761027 | 6/1971 | Belgium | ........................... 423/244.09 |
| 1 558 656 | 1/1980 | United Kingdom . | |

*Primary Examiner*—Steven P. Griffin
*Assistant Examiner*—Timothy C Vanoy

[57] ABSTRACT

There is provided a process for the incineration of gases containing sulphur compounds by contacting these gases with an oxygen-containing gas in the presence of a catalyst composition comprising (i) a metal selected from bismuth, molybdenum and chromium as a first metal component and (ii) at least one Group IIA metal as a second metal component, supported on a refractory oxide carrier not being a carrier comprising both aluminum and phosphorus.

1 Claim, No Drawings

PROCESS FOR GAS INCINERATION

BACKGROUND OF THE INVRNTION

The present invention relates to a catalyst composition, to a process for its preparation and to its use in catalytic incineration of gases containing sulphur compounds, particularly hydrogen sulphide.

The presence of hydrogen sulphide ($H_2S$) in process waste gases, which are released into the air, is bound to very stringent rules in most industrialised parts of the world. Waste gases containing $H_2S$ are produced in many different processes, such as, for instance, in the well-known Claus process. This Claus process produces an effluent which may contain over 5% by volume of $H_2S$ in addition to other sulphur compounds. A known method for reducing the level of sulphur compounds and $H_2S$ in the Claus off-gas is, for instance, subjecting this off-gas to a catalytic reduction treatment, thereby converting the sulphur compounds present into $H_2S$, and subsequently removing the bulk of $H_2S$ by an absorption treatment using a suitable $H_2S$-selective absorption solvent The absorption solvent containing the bulk of the $H_2S$ is then regenerated, after which the desorbed $H_2S$ is returned to the Claus-unit and the cleaned solvent is re-used. The final off-gas from the absorption treatment containing only minor amounts of $H_2S$ is normally incinerated, thereby converting $H_2S$ into sulphur dioxide ($SO_2$), which is less harmfil than $H_2S$. Tolerable levels of $SO_2$ in waste gases released into the air are, consequently, much higher under air pollution regulations than the tolerable levels of $H_2S$. The incinerated gas should normally contain less than 10 ppm on a volume basis of $H_2S$.

Incineration of $H_2S$-containing waste gases nowadays is normally conducted either in a catalytic process or in a non-catalytic (thermal) process. Major considerations for applying a catalytic incineration process are, relative to a non-catalytic incineration process, a reduced heat input and a more selective formation of $SO_2$, whereby the formation of $SO_3$ is suppressed as much as possible for reasons of corrosion and air pollution abatement.

In U.K. patent specification No. 1,558,656 a process for the catalytic incineration of $H_2S$-containing waste gases is disclosed, wherein such waste gas is contacted with a stoichiometric excess of oxygen having regard to the contained $H_2S$ in the presence of a catalyst composition comprising copper (Cu) and bismuth (Bi) as the catalytically active components supported on a carrier material, which suitably is alumina. Although the CuBi/alumina performs satisfactorily in many respects, there is still room for improvement, particularly in terms of reducing the activity of the catalyst for $H_2$ oxidation and for the undesired formation of the corrosive $SO_3$ and $H_2SO_4$. The occurrence of $H_2$ oxidation is undesired, because the heat generated in this exothermic reaction may lead to a thermal run away reaction. By reducing the activity of the incineration catalyst for $H_2$ oxidation, the risk of a thermal run away reaction is reduced, which obviously is beneficial for reasons of process control. Furthermore, the $H_2$ oxidation may also trigger other undesired reactions, such as the conversion of CO into COS and the (thermal) conversion of hydrocarbons. Reducing the formation of $SO_3$ and $H_2SO_4$ by increasing the selectivity of the catalyst for the conversion of sulphur compounds, in particular $H_2S$, into $SO_2$ is also desired for environmental reasons (reduced air pollution) and for reasons of a reduced corrosion of the equipment used.

It has been found that a catalyst comprising at least one Group IIA metal in addition to bismuth, chromium or molybdenum indeed reduces $H_2$ oxidation and formation of $SO_3$ and $H_2SO_4$, whilst at the same effectively converting $H_2S$ and other gaseous sulphur components that may be present in a waste gas or off-gas, such as carbonyl sulphide (COS) and carbon sulphide ($CS_2$), with oxygen into $SO_2$.

SUMMARY OF THE INVENTION

The present invention, accordingly, relates to a catalyst composition comprising (i) a metal selected from bismuth, molybdenum and chromium as a first metal component and (ii) at least one Group IIA metal as a second metal component, supported on a refractory oxide carrier not being a carrier comprising both aluminium and phosphorus.

DETAILED DESCRIPTION OF THE INVENTION

The catalyst composition according to the present invention comprises two metal components. The first metal component may comprise bismuth, molybdenum or chromium with bismuth being preferred. The second metal component comprises one or more metals from Group IIA of the Periodic Table of Elements. Particularly suitable Group IIA metals for application as the second metal component are magnesium, calcium and barium, though beryllium and strontium may also be applied. Of these, calcium is the preferred Group IIA metal.

The first metal component is present in an amount in the range of from 0.5 to 10% by weight, preferably 0.8 to 5.0% by weight, indicating the amount of metal based on the total weight of the catalyst composition. Using the first metal component in amounts lower than 0.5% by weight is possible, but will normally not result in a sufficiently high catalytic activity. On the other hand, applying amounts of more than 10% by weight will not result in a substantially improved catalytic performance and is also less preferred from a cost perspective. The second metal component, i.e. the Group IIA metal, is present in such amount that the molar ratio of this second metal component relative to the first metal component is at least 0.2 and preferably does not exceed 30. More preferably, said molar ratio has a value in the range of from 0.3 to 20, most preferably from 0.4 to 10.

The first and second metal component may be present in elemental form and/or as a compound, such as oxides, hydroxides, sulphides, nitrates, phosphates, sulphates, halides, acetates, citrates, carbonates or mixtures of tnvo or more of these. Suitably, the metal components are present as oxides, sulphates and/or phosphates at the start of the incineration process and are converted at least partly into sulphides or sulphates during the incineration process under the operating conditions applied. However, it appears not to be particularly critical in which form the metals are present on the catalyst The carrier may be any refractory oxide carrier which does not comprise both aluminium and phosphorus. Accordingly, carriers which comprise aluminium and at the same time are essentially free of phosphorus, i.e. which do not comprise more than trace amounts (less than 100 ppm) of phosphorus, may be used. For instance, alumina may very suitably be used as the refractory oxide carrier and is even a preferred carrier. Most preferred alumina carriers are γ-alumina, η-alumina and mixtures thereof. Another aluminium-containing carrier that may suitably be used is aluminium hydroxide. On the other hand, carriers which comprise phosphorus and at the same time are essentially free of aluminium are also suitable as carriers. An example of such carrier is calcium phosphate. Other suitable refractory oxide carriers include titania, zirconia, silica, boria, amorphous silica-alumina and combinations of two or more of these. To the latter list of carriers, with exception of silica-alumina, phosphorus may be added, suitably in amounts not exceeding 25% by weight, more suitably not exceeding 15% by weight, calculated as weight percentage of elemental phosphorus relative to the total weight of the carrier.

The present invention also relates to a process for the preparation of the catalyst composition described above, which process comprises the steps of:

(a) treating the refractory oxide carrier with one or more solutions comprising one or more dissolved salts of bismuth, molybdenum or chromium and at least one Group IIA metal, (b) drying and calcining the thus impregnated carrier, Step (a) of the preparation may involve impregnation, co-extrusion ancuor precipitation. In case of impregnation the refractory oxide carrier is contacted with one or more solutions comprising one or more dissolved salts of the metal components to be used for sufficient time to allow the metal components to be impregnated onto the carrier. Most conveniently, one single impregnating solution comprising all metal components in dissolved form is used. Soluble metal salts that may be used include nitrates, citrates and lactates. However, it is also possible to use distinct impregnating solutions, which each contain a single metal component and which are used subsequently, optionally with drying in-between. A preferred method of impregnating the carrier is the so-called pore volume impregnation, which involves the treatment of a carrier with a volume of impregnating solution, whereby said volume of impregnating solution is substantially equal to the pore volume of the carrier. In this way, full use is made of the impregnating solution.

Step (a) may also involve extruding the carrier with one or more solutions comprising the catalytically active metals in dissolved form. The same type of solutions as used in case of impregnation may be used. This co-extrusion method may also result in useful catalyst particles. Yet another way of carrying out step (a) is by precipitating the catalytically active metals in the presence of the carrier, so that precipitation takes onto the surface of the carrier particles. Such precipitation can, for instance, be achieved by combining two solutions each comprising a dissolved salt of a catalytically active metal in the presence of the carrier particles, said dissolved salts being chosen such that upon combining the salt solutions the metal ion of the first salt forms an insoluble salt with the negatively charged ion of the second salt and the metal ion of the second salt forms an insoluble salt with the negatively charged ion of the first salt. Alternatively, the pH of the metal salt solution(s) is modified in such way in the presence of the carrier particles that precipitation occurs. It will be appreciated that a combination of two or more of the techniques useful for carrying out step (a) may be combined.

Step (b) involves drying and calcining of the impregnated carrier. Drying is normally carried out at temperatures in the range of from 100 to 400° C., preferably 150 to 350° C., whilst calcination is suitably conducted at a temperature in the range of from 300 to 650° C., preferably 350 to 550° C. The calcination may be carried out in an inert atmosphere, such as in a nitrogen atmosphere, but it is preferred to calcine the material in air, thus converting at least part of the metal components present in the catalyst composition into metal oxides.

The present invention also aims to provide an effective process for removing sulphur-containing compounds, and particularly $H_2S$ and COS, from off-gases containing such species by means of catalytic incineration. More specifically, the present invention aims to provide a process wherein $H_2S$ is effectively removed from off-gases by converting it with oxygen in the presence of a catalyst into $SO_2$, thereby forming essentially no $SO_3$, and wherein other sulphur-containing compounds present in the off-gas, in particular COS, are also oxidised.

The present invention, accordingly, also relates to a process for the incineration of gases containing sulphur compounds by contacting these gases with an oxygen-containing gas in the presence of a catalyst as described hereinbefore.

The gas to be treated may be any gas containing oxidisable sulphur compounds, which need to be removed from that gas, including $H_2S$, COS and $CS_2$. In general, the $H_2S$ content of the gases to be treated in the present process may vary within wide limits and will normally range from 30 ppm on a volume-bases (ppmv) up to 1% by volume. At higher levels, additional preceding absorption treatments or combined reduction and absorption treatments are normally required in order to avoid the generation of too much heat in the exothermic incineration reaction, thus making the incineration ineffective from both an economic and a processing perspective. Most suitably, the gas to be treated comprises between 50 ppmv and 500 ppmv of $H_2S$. Particularly the $H_2S$-containing off-gases from the absorption treatment of reduced Claus off-gases, which normally comprise between 50 ppmv and 500 ppmv of $H_2S$, are effectively treated in a catalytic incineration process employing the present catalyst composition. $H_2S$ levels in the incinerated gas in most industrialised countries should be less than 10 ppmv.

Other sulphur compounds like COS and $CS_2$ are usually present in the gas to be treated in smaller quantities than $H_2S$. Accordingly, the individual levels of COS and $CS_2$ are normally below 500 ppmv and suitably are below 100 ppmv, more suitably below 50 ppmv.

The amount of oxygen to be supplied to the incineration zone should be sufficient to convert all sulphur compounds present into $SO_2$, which implies that at least a stoichiometric amount of oxygen relative to the amount of sulphur compounds present should be used. It is preferred to use a stoichiometric excess of oxygen relative to the amount of sulphur compounds present in the gas to be incinerated. In this way, namely, it is assured that a sufficiently large quantity of sulphur compounds is converted. Accordingly, it is preferred to use at least 1.5 times the stoichiometric amount of oxygen relative to the amount of sulphur compounds present. Normally, at least twice the stoichiometric amount of $H_2S$ present is also sufficient. The upper limit of oxygen to be supplied is in fact determined by economic and practical considerations. In this connection it is important that too much oxygen will favour the formation of $SO_3$, which is undesired. In practice this implies that normally up to five times the stoichiometric amount of oxygen relative to the amount of sulphur compounds present in the gas to be treated will be used. The source of oxygen may be pure oxygen, air or a mixture of these or any other gaseous stream containing sufficient quantities of oxygen, provided the other gaseous components present do not adversely affect the envisaged incineration reactions.

The reaction conditions to be applied in the catalytic incineration process are those known in the art, for instance from U.K. patent specification No. 1,558,656 discussed hereinbefore, and include operating temperatures of from 150 to 450° C., preferably 250 to 420° C., operating pressures from 0.5 to 10 bar, preferably 1 to 5 bar, but most conveniently atmospheric pressure, and gaseous hourly space velocities (GHSV) of from 500 to 50,000 vol/vol/hr, preferably from 2,000 to 10,000 vol/vol/hr.

The invention is furher illustrated by the following examples without restricting the scope of the present invention to these particular embodiments.

EXAMPLE 1

A CaBi/alumina catalyst is prepared by impregnating η-alumina spheres, diameter 4 mm) with an aqueous solution of calcium nitrate and bismuth citrate, after which the impregnated alumina is dried and calcined at 480° C. for one-and-a-half hour. This catalyst is further denoted as Catalyst A.

Properties of Catalyst A are listed in Table I.

COMPARATIVE EXAMPLE 1

The procedure of Example 1 for preparing Catalyst A is repeated, except that the η-alumina spheres were impregnated with an aqueous solution of copper (II) sulphate and bismuth citrate.

Properties of the comparative Catalyst A' are also listed in Table I. In this table "M" refers to the second metal component beside Bi and "M/Bi" indicates the molar ratio between the second metal component and Bi.

TABLE I

| Catalyst Properties | | |
|---|---|---|
| | Cat A | Cat A' |
| M | Ca | Cu |
| M (% w) | 1.0 | 1.0 |
| Bi (% w) | 3.0 | 3.0 |
| M/Bi | 1.1 | 1.1 |

EXAMPLE 2

A gas consisting of 0.19 vol % COS, 0.019 vol % $H_2S$, 0.023 vol % $CO_2$, 4.3 vol % $O_2$, 5 vol % $H_2$ and balance up to 100 vol % argon is contacted with a bed of Catalyst A. The temperature was gradually increased and the level of $H_2$ oxidation (in vol % relative to the volume of hydrogen present in the feed gas) is measured at 300° C., 350° C., 400° C., 450° C., 500° C. and 550° C. At the same time the temperature at which plume formation starts to occur at the outlet of the reactor, indicating the formation of the undesired $SO_3$, is measured. This temperature ($T_{plume}$) is an indication of the maximum operating temperature of the catalyst without $SO_3$ formation occurring and hence is an indication of the selectivity of the catalyst towards the conversion of the sulphur compounds present into $SO_2$: the higher this temperature, the higher the selectivity of the catalyst.

The same procedure is repeated with Catalyst A'. Results are indicated in Table II.

TABLE II

| $H_2$ Oxidation and Selectivity | | |
|---|---|---|
| | Catalyst A | Catalyst A' |
| $H_2$ oxidation (%) at | | |
| 300° C. | 0 | 1 |
| 350° C. | 4 | 11 |
| 400° C. | 7 | 34 |
| 450° C. | 19 | 84 |
| 500° C. | 46 | 100 |
| 550° C. | 79 | 100 |
| $T_{plume}$ (° C.) | 535 | 445 |

From Table II it can be seen that Catalyst A is much less active in the oxidation of $H_2$ than Catalyst A'. Thus, when using Catalyst A the chance of a thermal run away reaction due to the $H_2$ oxidation reaction proceeding uncontrollably is much less than when using Catalyst A'.

Furthermore, Table II shows that catalyst a exhibits a significantly higher selectivity towards the conversion of sulphur compounds present in the feed gas into $SO_2$ than the comparative catalyst A'.

We claim:

1. Process for the incineration of gases containing at least one sulfur compound selected from the group consisting of hydrogen sulfide, carbonyl sulfide and carbon disulfide by contacting these gases with an oxygen-containing gas in the presence of a catalyst composition consisting essentially of (i) a metal selected from bismuth, molybdenum and chromium as a first metal component and (ii) at least one Group IIA metal as a second metal component, supported on a refractory oxide carrier not being a carrier comprising both aluminium and phosphorus.

* * * * *